US012190606B2

(12) United States Patent
Groh (10) Patent No.: US 12,190,606 B2
(45) Date of Patent: Jan. 7, 2025

(54) PLAUSIBILIZING THE OUTPUT OF NEURAL CLASSIFIER NETWORKS

(71) Applicant: Robert Bosch GmbH, Stuttgart (DE)

(72) Inventor: Konrad Groh, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 989 days.

(21) Appl. No.: 17/185,065

(22) Filed: Feb. 25, 2021

(65) Prior Publication Data
US 2021/0295154 A1 Sep. 23, 2021

(30) Foreign Application Priority Data
Mar. 23, 2020 (DE) .......................... 102020203707.8

(51) Int. Cl.
*G06V 20/58* (2022.01)
*G05D 1/00* (2006.01)
(Continued)

(52) U.S. Cl.
CPC ......... *G06V 20/582* (2022.01); *G05D 1/0221* (2013.01); *G05D 1/0231* (2013.01);
(Continued)

(58) Field of Classification Search
CPC .... G06V 20/582; G06V 20/58; G06V 10/454; G06V 10/82; G06V 10/764; G06V 20/56;
(Continued)

(56) References Cited

U.S. PATENT DOCUMENTS 10,509,410 B2 * 12/2019 Hammond ............. G05D 1/024
10,754,037 B2 * 8/2020 Englard ................ B60W 10/04
(Continued)

FOREIGN PATENT DOCUMENTS

GB 2454857 B 6/2010

OTHER PUBLICATIONS

Tao, et al.: Attacks meet Interpretability: Atribute-steered Detection of Adversarial Samples, 32nd Conference on Neural Informaiton Processing Systems (NeurIPS 2018), Montreal, Canada, pp. 7717-7728.

*Primary Examiner* — Beau D Spratt
(74) *Attorney, Agent, or Firm* — NORTON ROSE FULBRIGHT US LLP; Gerard A. Messina (57) ABSTRACT

A method for plausibilizing the output of an artificial neural network (ANN) used as classifier. The method includes the following steps: a plurality of images, for which the ANN has determined an assignment to one or more classes of a predetermined classification, as well as the assignment determined in each case by the ANN are provided; for each combination of one image and one assignment, a location-resolved relevance evaluation of the image is determined utilizing a relevance evaluation function, this relevance evaluation indicating which parts of the image have contributed, to what extent, to the assignment; a further classifier is trained to determine from one image and one relevance evaluation ascertained for the image, a reconstruction of the assignment to which this relevance evaluation relates; based on the agreement between the reconstructions and the actual assignments, a figure of merit is determined for the relevance evaluation function.

14 Claims, 3 Drawing Sheets

(51) Int. Cl.
*G06F 18/214* (2023.01)
*G06N 3/04* (2023.01)
*G06N 3/08* (2023.01)
*G06V 10/44* (2022.01)
*G06V 10/764* (2022.01)
*G06V 10/82* (2022.01)
*G06V 20/56* (2022.01)

(52) U.S. Cl.
CPC ............. *G06F 18/214* (2023.01); *G06N 3/04* (2013.01); *G06N 3/08* (2013.01); *G06V 10/454* (2022.01); *G06V 10/764* (2022.01); *G06V 10/82* (2022.01); *G06V 20/56* (2022.01); *G06V 20/58* (2022.01)

(58) Field of Classification Search
CPC .. G06F 18/214; G05D 1/0221; G05D 1/0231; G06N 3/04; G06N 3/08
See application file for complete search history.

(56) References Cited

U.S. PATENT DOCUMENTS

| | | | |
|---|---|---|---|
| 10,810,491 B1 * | 10/2020 | Xia | G06N 3/04 |
| 2015/0102922 A1 * | 4/2015 | Witmer | G08B 13/2491 |
| | | | 340/527 |
| 2019/0114481 A1 * | 4/2019 | DeChant | G06V 10/764 |
| 2019/0385024 A1 * | 12/2019 | Croxford | G06N 3/08 |
| 2020/0074622 A1 * | 3/2020 | Yang | G06N 3/08 |
| 2020/0380292 A1 * | 12/2020 | Tang | G06V 10/764 |
| 2022/0019840 A1 * | 1/2022 | Xie | G06Q 30/0282 |

* cited by examiner

PLAUSIBILIZING THE OUTPUT OF NEURAL CLASSIFIER NETWORKS

CROSS REFERENCE

The present application claims the benefit under 35 U.S.C. § 119 of German Patent Application No. DE 102020203707.8 filed on Mar. 23, 2020, which is expressly incorporated herein by reference in its entirety.

FIELD

The present invention relates to plausibilizing the output of neural classifier networks which are used, for example, to identify objects from image data.

BACKGROUND INFORMATION

Approximately 90% of the information needed by a human driver to guide a vehicle in road traffic is visual information. For the at least partially automated guidance of vehicles, it is therefore indispensable that images which are recorded during the monitoring of the vehicle environment be correctly evaluated in terms of content, no matter what their modality. Of particular importance for the task of driving is classification of the images in terms of what traffic-relevant objects they contain such as, e.g., other road users, lane markings, obstacles and traffic signs.

To manage this complexity, artificial neural networks are employed. For example, such neural networks may be made up of a plurality of series-connected layers in which the dimensionality of the task is reduced considerably by the use of convolution kernels and by downsampling. Neural networks of this kind are also characterized in that the data is processed in massively parallel fashion. Great Britain Patent No. GB 2 454 857 B gives an example for a method in which with the aid of a self-learning neural network, a microscopic image is classified in terms of what objects it contains.

Since here, it is a question of a safety-related functionality, the reliability of the object detection must be substantiated for the authorization for use in road traffic, and must be monitored during operation of the vehicle.

SUMMARY

Within the scope of the present invention, an example method is provided for plausibilizing the output of an artificial neural network, ANN, used as classifier.

In accordance with an example embodiment of the present invention, in this method, a plurality of images is provided, for which in each case the ANN has determined an assignment to one or more classes of a predetermined classification. For example, the classes may represent different road users, traffic signs, roadway edges or other objects. The specific assignment is likewise provided. Thus, pairings exist made up of images on one hand and assignments to one or more classes on the other hand. In particular, the assignment may be a vector, for example, in which in each case one component indicates for exactly one class, the probability and/or confidence with which the image is to be attributed to this class. In this context, for instance, the vector may be a "one hot" vector, in which only one component is equal to 1, while all other components are equal to 0. However, the vector may also be a softmax vector, for instance, and include several components other than zero, which add up to 1.

For each combination of one image and one assignment, a location-resolved relevance evaluation of the image is determined, utilizing a relevance evaluation function. This relevance evaluation ("saliency map") indicates which parts of the image have contributed, to what extent, to the assignment. Such a relevance evaluation may be used in various ways to plausibilize the output of the ANN.

Thus, for example, for certain combinations of one image and one assignment, it is possible to check visually by sampling whether the decision to assign an object to the class "automobile", for instance, was made substantially on the basis of image areas which actually show an automobile. If an object has been classified as automobile, but this decision was made on the basis of image areas which show a tree, for instance, then this assignment is not reasonable at all. Even if the image actually shows an automobile at another location, the quintessence is nevertheless that image areas which show a tree have been classified erroneously as automobile. In the case of complex scenery having a large number of objects, there is therefore reason to fear that in the end, the quantity of objects recognized altogether in an image of the scenery will not coincide with the quantity of objects actually present in the scenery.

Alternatively or in combination with this, the relevance evaluation may also be assessed mechanically using any automated process, which then makes it possible to take the step from checking by random sampling, to 100% monitoring of all assignments ascertained by the ANN. Exemplary forms for such a mechanical assessment are indicated in the following.

Regardless of whether the relevance evaluation is assessed visually or mechanically, the credibility of this evaluation hinges on the rightness of the relevance evaluation function for the specific application. Many such relevance evaluation functions are available in the related art, each having been developed for certain applications. There is no mathematical guarantee a priori that a specific relevance evaluation function is correct for a specific application.

Therefore, a further classifier is trained to determine from one image and one relevance evaluation ascertained for this image, a reconstruction of the assignment to which this relevance evaluation relates. Based on the agreement thereby attained between the reconstructions and the actual assignments, a figure of merit is determined for the relevance evaluation function. The agreement may be determined according to any metric as desired, for instance, by quantitative evaluation of a confusion matrix. For instance, the agreement may be determined as the ratio of the number of correct predictions to the total number of predictions (accuracy).

For example, if a large number of images which show vehicles were assigned to the class "vehicle", and according to the relevance evaluation, in each case image areas which actually show a vehicle have contributed to this decision, then in its finished trained state, the further classifier will in turn assign the combination of one image and one relevance evaluation, which evaluates an area in the image having one or more vehicles as particularly relevant, to the class "vehicle." The relevance—ascertained by the relevance evaluation function—of image parts for the categorization into classes by the ANN is thus consistent with the categorization into classes supplied by the ANN. Therefore, in this case, the relevance evaluation function is evaluated with a good figure of merit.

On the other hand, if the decision for the class "vehicle" is based in one half of the cases on image areas which show one or more vehicles, and in the other half of the cases, on image areas which show one or more trees, this does not alter the fact that the further classifier assigns combinations made up of one image and one relevance evaluation-which in this image evaluates one or more trees as particularly relevant-primarily to the class "tree". The reconstruction "tree" thus deviates from the actual assignment "vehicle" which the ANN has made. The relevance, ascertained by the relevance evaluation function, of image parts for the categorization into classes by the ANN is thus not in keeping with the categorization into classes supplied by the ANN. Therefore, the figure of merit for the reference evaluation function is poorer in this case.

As example, the further classifier may in particular be a linear classifier. For instance, it may take the form of an ANN. However, any other type of machine-learning model ideally having great generalization power may also be considered.

In one particularly advantageous development of the present invention, the quantity of available combinations of images, assignments and relevance evaluations is split into a first subset of training data for the further classifier and a second subset of test data for the further classifier. The further classifier is trained on the basis of the training data. The agreement between the reconstructions and the actual assignments is determined on the basis of the test data. In this way, the tendency, called "overfitting", of the further classifier to more or less "learn by heart" the information contained in the training data instead of to generalize it, is suppressed.

In one especially advantageous refinement of the present invention, the figure of merit is determined for a selection of several candidate relevance evaluation functions. One candidate relevance evaluation function having the best value of the figure of merit is selected as relevance evaluation function. It is then considerably more credible that in the specific application, precisely this relevance evaluation function correctly measures the relevance of image areas for decisions by the ANN.

In a further particularly advantageous refinement of the present invention, the figure of merit is determined additionally for.
  the identical mapping of the image, and/or
  an area filled with random values, and/or
  an area filled with one constant value, and/or.
  a semantic segmentation of the image, and/or
  an edge detection from the image
    as location-resolved comparison relevance evaluation.
    These comparison relevance evaluations correspond to relevance evaluation functions that contain no information whatsoever about the architecture of the ANN used, and thus represent a "guess" of the relevance evaluation.

Any relevance evaluation function which is motivated by knowledge about the architecture of the ANN and/or about the specific application should attain a better figure of merit than a relevance evaluation function which manages completely without such knowledge. This is comparable, for instance, to the case where a better growth in value of a stock portfolio is expected at the least from any fund manager who takes care of the portfolio for an investment fund, than is expected within the same period of time for an average portfolio assembled by random generator. If the fund manager does not accomplish this, it must be assumed that his/her way of working is fundamentally deficient.

Namely, that is why, for example, a relevance evaluation function or candidate relevance evaluation function whose figure of merit is poorer than the figure of merit of the comparison relevance evaluation function may be rejected as implausible.

In another particularly advantageous development of the present invention, a parameterized ansatz having free parameters may be set up for the relevance evaluation function. The parameters of this ansatz may then be optimized with the objective that the figure of merit of the relevance evaluation function will assume an extremum. The figure of merit is thus a guideline for the optimization, so to speak.

The sought plausibility of the output of the ANN may be evaluated on the basis of the relevance evaluation function and/or on the basis of the figure of merit of this relevance evaluation function and/or on the basis of a relevance evaluation determined using this relevance evaluation function. Regardless of the manner in which this evaluation is carried out, it is put on a quantitatively motivated basis.

For instance, here the plausibility may depend explicitly on the figure of merit. For example, the mere existence of any relevance evaluation function which has an especially advantageous figure of merit may already suggest that overall, the output of the ANN is inherently conclusive and plausible:

That which is inherently contradictory cannot be explained conclusively with a relevance evaluation function, regardless of how it is formed.

However, the figure of merit may also be used indirectly in determining the plausibility, for instance, in that by optimizing the figure of merit, the relevance evaluation function best matching the specific application is discovered, and this relevance evaluation function is then in turn utilized to evaluate the plausibility of the output of the ANN.

In a further, particularly advantageous refinement, the plausibility ascertained is output to the user of the ANN via a display. The user is thereby enabled to recognize malfunctions of an ANN, used as classifier, in timely fashion and to initiate countermeasures. The character of a "black box" is thereby removed from the ANN. Instead, its behavior becomes explainable. As a result, a technical system which triggers actions on the basis of assignments to classes ascertained by the classifier is in turn able to be used more reliably.

As explained above, in particular, the evaluation may be carried out by machine. For this purpose, the invention provides a further method for plausibilizing the output of an ANN used as classifier.

As part of this method according to an example embodiment of the present invention, at least one image is provided for which the ANN has determined an assignment to one or more classes of a predetermined classification. Moreover, this assignment determined by the ANN is provided, as well.

For the combination of the image and the assignment, a location-resolved relevance evaluation of the image is determined, utilizing a relevance evaluation function, this relevance evaluation indicating which parts of the image have contributed, to what extent, to the assignment. For instance, this relevance evaluation function may have been selected and/or formed in the course of the previously described method, so that to a great extent, it is quantitatively motivated. However, the relevance evaluation function may also be derived from any other source.

A correlation is determined between the relevance evaluation on one hand and a semantic segmentation of the image, and/or an edge detection from the image, on the other hand. For instance, if the relevance evaluation, the semantic segmentation and/or the edge detection are each available as two-dimensional images, the correlation may be determined, e.g., as a two-dimensional discrete cross correlation. The correlation is judged to be a measure for the plausibility of the output of the ANN.

In this context, the semantic segmentation of the image may utilize assignments of image areas to classes, which the analyzed ANN or any other ANN has supplied. However, the semantic segmentation may also be derived from any other source. Likewise, the edge detection may be determined with or without use of an ANN.

The absolute value of the correlation is a function of the manner in which the semantic segmentation, or the edge detection, is determined. However, assuming correct functioning of the class assignment by the ANN, the absolute value should not change substantially or should change only within specific limits during ongoing operation of the ANN. The extent to which the class assignment is still functioning reliably may thus be monitored during operation of the ANN and the image recording which supplies this ANN with images.

For example, while traveling, the image quality supplied by a camera system may suddenly worsen considerably because the vehicle is entering into a fog bank or because the low sun all of a sudden fully strikes the camera sensor and drives it into saturation. The detection of edges is then substantially poorer than when photographing conditions are good. Assuming an unchanged location-resolved relevance evaluation, the correlation thus decreases, so that the output of the ANN is evaluated as less plausible.

However, for example, a traffic sign newly introduced by the legislative body may also be classified incorrectly by an ANN not yet trained with respect to this traffic sign. Thus, for example, the "low emission zone" traffic sign is modeled to a large extent on the "30 Km/h zone" traffic sign; only the number "30" was exchanged for the words "low emission". An ANN which does not yet know the "low emission zone" traffic sign will therefore probably assign an image of this traffic sign to the "30 Km/h zone" class. However, the location-resolved relevance evaluation for the area of the image having the words "low emission" will be less than for the rest of the image, which does not differ from an image of a "30 Km/h zone" traffic sign. Thus, in the area having the words "low emission", the location-resolved relevance evaluation correlates more poorly with the edges visible in the image than is the case in the rest of the image. Therefore, the output of the ANN is evaluated as less plausible.

Furthermore, for example, by manipulating the image with malicious intent, a deliberate attempt may be made to cause an incorrect classification by the ANN. Thus, for instance, by applying stickers that are inconspicuous in appearance, a traffic sign may be altered in such a way that the ANN recognizes it as a traffic sign with a completely different meaning (for instance, "70 Km/h" instead of "stop"). In this case, the sticker is deemed more relevant by the ANN than, for instance, the octagonal shape of the stop sign clearly recognizable in the edge detection. The correlation of the relevance evaluation with the edge detection is thus poor.

In one particularly advantageous development of the present invention, in response to a drop of the correlation below a predetermined threshold value, a technical system which acts in at least partially automated fashion based on the assignment determined by the ANN is controlled to the effect that disadvantageous consequences of an incorrect assignment are reduced.

Thus, for example, an at least partially automated vehicle may drive more slowly and/or defensively so as to increase the probability of avoiding collisions or at least mitigating their consequences. An access control system which checks a submitted access medium (such as an identity card or a biometric feature) may deny access in the event of a poor correlation or may request an additional authentication (for instance, a PIN). A quality control system for products produced in series may subject products to a more time-consuming but thorough inspection method. A system for the evaluation of medical image data may mark images or image areas in which the correlation is poor, for examination by an expert.

In another especially advantageous development of the present invention, an image is selected which has come about through the observation of the area surrounding a robot and/or vehicle. In particular, the robot and/or the vehicle may be semi-autonomous, for example. In response to a drop of the correlation below a predetermined threshold value, the robot and/or the vehicle is/are controlled to the effect that at least one additional physical sensor is activated for observing the area surrounding the robot and/or vehicle; and/or the driving speed of a robot and/or vehicle driving in at least partially automated fashion is reduced; and/or a driver assistance system and/or a system for the at least partially automated guidance of the robot and/or vehicle is completely or partially deactivated; and/or a robot, or a vehicle driving in at least partially automated fashion, is brought to a stop on a preplanned emergency-stop trajectory.

Thus, for instance, in response to deterioration of the correlation between the location-resolved relevance evaluation of a camera image and the edges visible in this camera image, a radar sensor or a LIDAR sensor may be switched in in order to resolve inconsistencies and/or ambiguities in the detection of objects. In the example indicated in which the low sun is shining on the camera, the low sun cannot interfere with the radar sensor.

In particular, for instance, different threshold values may be determined for the correlation, with various actions being triggered if the threshold values are not attained. Thus, for example, in the event a first threshold value is not attained, on the turnpike, the vehicle may join the slower flow of traffic in the right lane in order to stop in the breakdown lane in response to a drop below a second threshold value.

In particular, the ANN may be a convolutional ANN. For example, the relevance evaluation function may then include a weighted sum of activation cards of a plurality of convolution kernels that are applied to the image or to a processing product of the image in one layer of the ANN.

In particular, the example methods may be completely or partially computer-implemented. Therefore, the present invention also relates to a computer program having machine-readable instructions which, when they are executed on one or more computers, prompt the computer(s) to carry out one of the example methods described herein. In this sense, control units for vehicles and embedded systems for technical devices, which likewise are capable of executing machine-readable instructions, are also to be regarded as computers.

In the same way, the present invention also relates to a machine-readable data carrier and/or a download product with the computer program. A download product is a digital product that is transmittable via a data network, that is, is downloadable by a user of the data network, and that may be offered for sale in an online shop for immediate download, for example.

In addition, a computer may be equipped with the computer program, with the machine-readable data carrier and/or with the download product.

Further measures improving the present invention are presented in greater detail below with the aid of the figures, together with the description of the preferred exemplary embodiments of the present invention.

DETAILED DESCRIPTION OF EXAMPLE EMBODIMENTS

Figure 1:
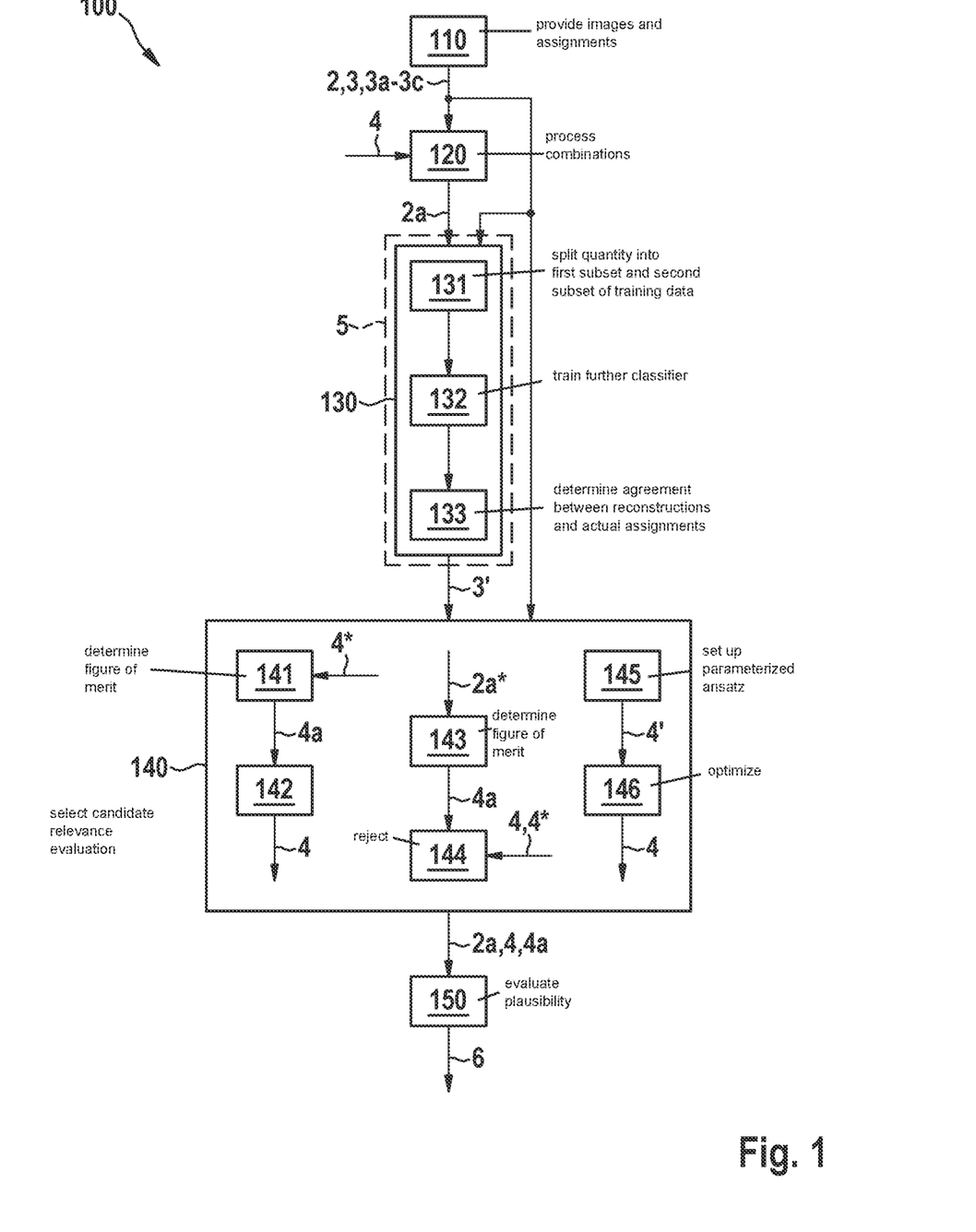
FIG. 1 shows an exemplary embodiment of method 100 in accordance with the present invention, with which a figure of merit 4a is determined for a relevance evaluation function 4.

FIG. 1 is a schematic flow chart of an exemplary embodiment of method 100. Using this method, primarily a figure of merit 4a is determined for a relevance evaluation function 4. This in turn makes it possible to evaluate a plausibility 6 of the output of ANN 1.

In step 110, images 2 as well as assignments 3 of these images 2 to classes 3a-3c of a predetermined classification are provided. In step 120, combinations made up of one image 2 and one assignment 3 each are processed with the aid of a relevance evaluation function 4 to obtain a relevance evaluation 2a of image 2. This relevance evaluation 2a indicates which parts of image 2 have contributed, to what extent, to assignment 3.

In step 130, a further classifier 5 is trained to determine from one image 2 and a relevance evaluation 2a ascertained for this image, a reconstruction 3' of the assignment 3 to which this relevance evaluation 2a relates. For example, during such a training, parameters such as weights, for instance, of classifier 5 may be optimized so that for images 2 used during the training, reconstruction 3' corresponds as well as possible to assignment 3 actually determined by ANN 1. Based on the agreement between reconstructions 3' and actual assignments 3 which can be attained by this training, in step 140, a figure of merit 4a is ascertained for relevance evaluation function 4.

As an example, according to block 131, the quantity of available combinations of images 2, assignments 3 and relevance evaluations 2a may be split into a first subset of training data for further classifier 5 and a second subset of test data for further classifier 5. According to block 132, further classifier 5 may then be trained on the basis of the training data. The agreement between reconstructions 3' and actual assignments 3 may then be determined on the basis of the test data (block 133). As explained previously, further classifier 5 is then unable to "fake" a learning success by overfitting with respect to the training data. In principle, however, all combinations of images 2, assignments 3 and relevance evaluations 2a may also be utilized as training data, and it is then possible, for example, to measure how good the agreement is on average between reconstructions 3' and actual assignments 3.

Within box 140, various exemplary embodiments are indicated for how with the aid of figure of merit 4a, a relevance evaluation function 4 particularly suitable for the specific application may also be discovered at the same time.

According to block 141, figure of merit 4a may be determined for a selection of several candidate relevance evaluation functions 4*. According to block 142, one candidate relevance evaluation function 4* having the best value of the figure of merit may then be selected as relevance evaluation function 4.

According to block 143, figure of merit 4a may additionally be determined for
the identical mapping of image 2, and/or
an area filled with random values, and/or
an area filled with one constant value, and/or
a semantic segmentation 2b of image 2, and/or
an edge detection 2c from image 2
as location-resolved comparison relevance evaluation 2a*.

According to block 144, a relevance evaluation function 4 or candidate relevance evaluation function 4*, whose figure of merit 4a is poorer than figure of merit 4a determined for comparison relevance evaluation 2a*, may then be rejected as implausible.

According to block 145, a parameterized ansatz 4' having free parameters may be set up for relevance evaluation function 4. According to block 146, the parameters of this ansatz 4' may then be optimized with the objective that figure of merit 4a of relevance evaluation function 4 will assume an extremum.

Relevance evaluation function 4, and/or figure of merit 4a of this relevance evaluation function, and/or a relevance evaluation 2a ascertained with this relevance evaluation function 4 may be used in step 150 to evaluate a plausibility 6 of the output of ANN 1. However, this is optional. For instance, method 100 may also be utilized merely with the goal of discovering an optimal relevance evaluation function 4.

Figure 2:
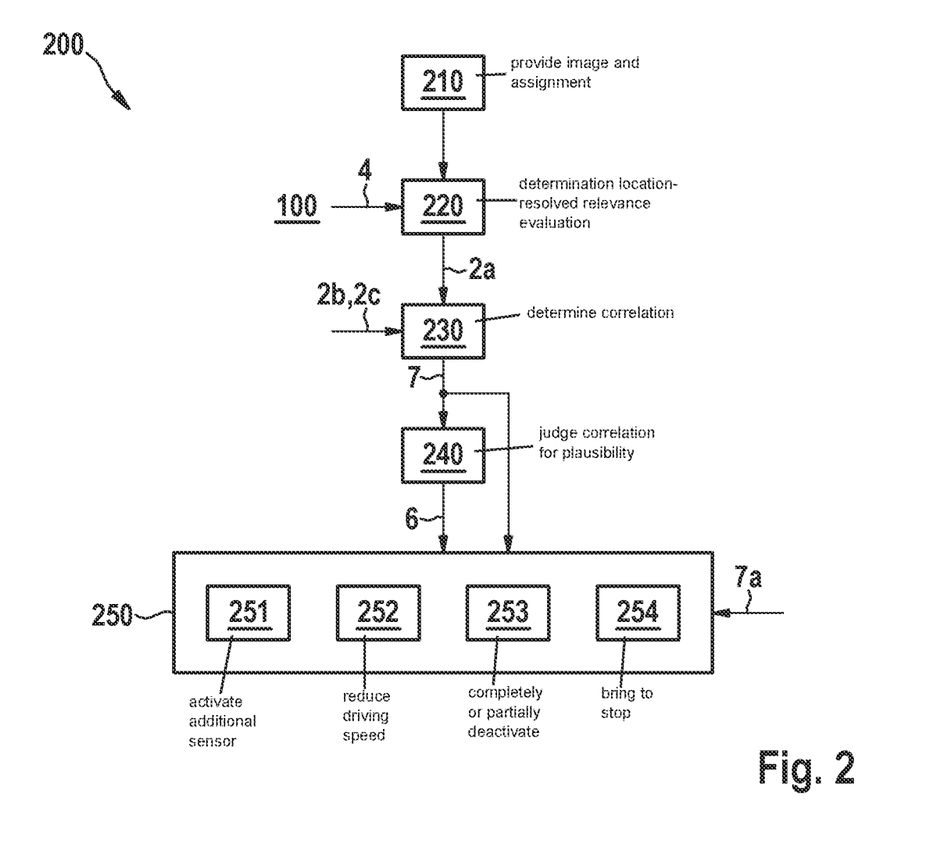
FIG. 2 shows an exemplary embodiment of method 200 in accordance with the present invention, with which plausibility 6 of the output of ANN 1 is valuated with the aid of a specific relevance evaluation function 4.

FIG. 2 is a schematic flow chart of an exemplary embodiment of method 200. This method 200 is based on the assumption that a suitable relevance evaluation function 4 is already implemented.

Analogous to step 110 of method 100, in step 210 of method 200, at least one image 2, for which ANN 1 has determined an assignment 3 to one or more classes 3a-3c of a predetermined classification, as well as assignment 3 determined by ANN 1 are provided.

Analogous to step 120 of method 100, in step 220 of method 200, a location-resolved relevance evaluation 2a of image 2 is determined for the combination of image 2 and assignment 3 by utilizing relevance evaluation function 4. This relevance evaluation 2a again indicates which parts of image 2 have contributed, to what extent, to assignment 3.

In step 230, a correlation 7 is determined between relevance evaluation 2a on one hand and a semantic segmentation 2b of image 2, and/or an edge detection 2c from image 2, on the other hand. In step 240, this correlation 7 is judged to be a measure for plausibility 6 of the output of ANN 1.

This plausibility 6, or perhaps correlation 7 directly, may then be compared in step 250 to a threshold value 7a, and a system acting in at least partially automated fashion may be controlled to the effect that disadvantageous consequences of an incorrect assignment are reduced.

Within box 250, various examples are indicated as to how this control may be implemented especially for vehicles.

According to block 251, at least one additional physical sensor may be activated for observing the vehicle environment.

According to block 252, the driving speed of a vehicle driving in at least partially automated fashion may be reduced. On the turnpike, for example, by way of precaution, the vehicle may be steered into the slower traffic in the right traffic lane.

According to block 253, a driver assistance system, and or a system for the at least partially automated guidance of the vehicle may be completely or partially deactivated.

According to block 254, a vehicle driving in at least partially automated fashion may be brought to a stop on a preplanned emergency-stop trajectory. Such an emergency-stop trajectory is kept available as standard in any system for the at least partially automated driving, in the event of a system failure.

Figure 3:
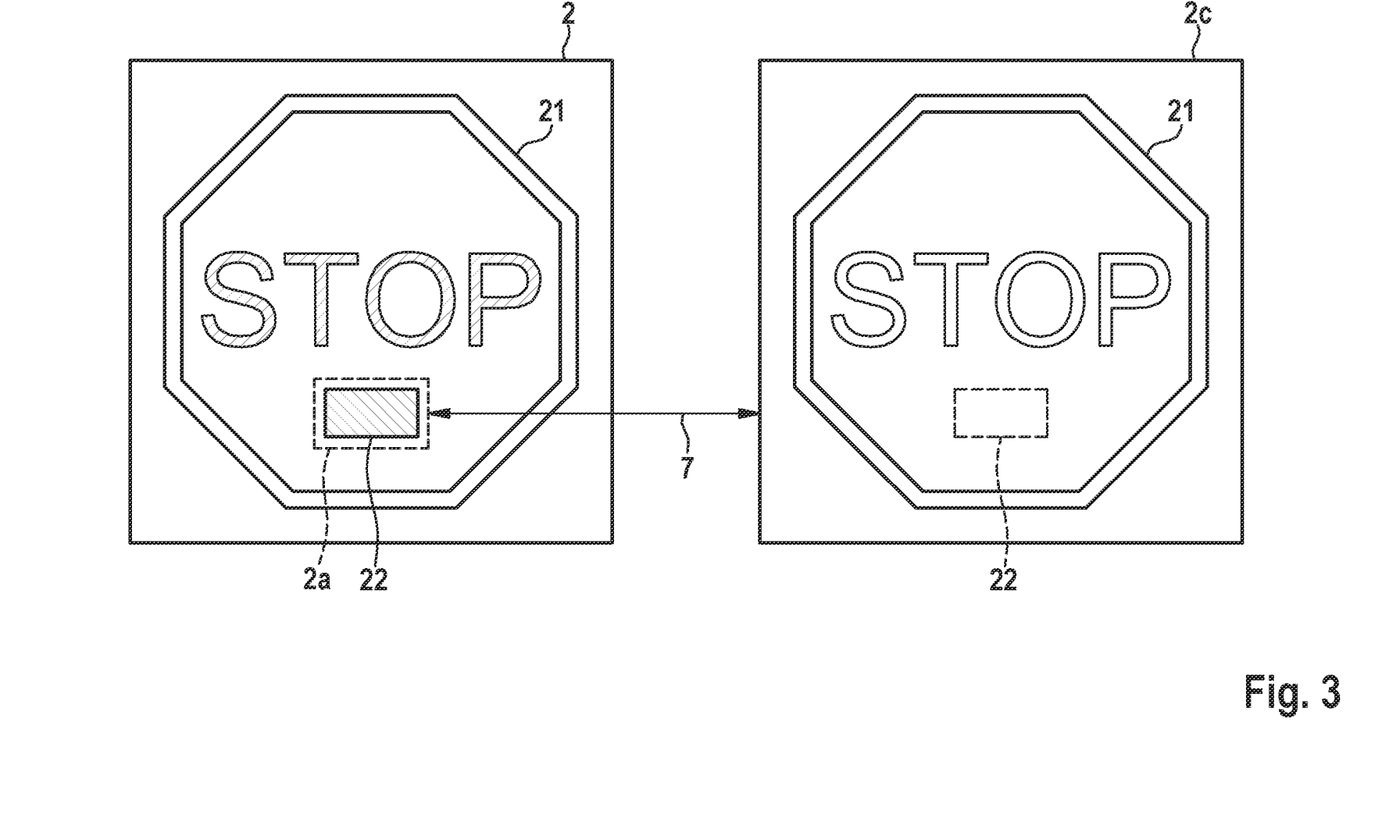
FIG. 3 shows an exemplary detection of an attack with an "adversarial example", utilizing method 200 in accordance with the present invention.

FIG. 3 shows an example for how an attack by an "adversarial example", thus, a manipulated image 2, on an ANN 1 used as classifier is able to be detected using method 200. In this example, image 2 shows a stop sign 21, which with malicious intent, was provided with a sticker 22. This sticker 22 is consciously formed with the intent that ANN 1 will classify stop sign 21 not as a stop sign, but rather as a 70 Km/h sign, for instance.

Should it succeed in "deceiving" ANN 1 in such a way, this implies that the area having sticker 22 has a particularly strong influence on assignment 3 determined by ANN 1. This means that this area has an especially high weight in location-resolved relevance evaluation 2a compared to the rest of image 2. This is illustrated in FIG. 3, in that only the area having sticker 22 is marked and provided with reference numeral 2a.

On the other hand, edge detection 2c from image 2 particularly highlights the features of stop sign 21, while sticker 22 is only faintly discernible, if at all. Stickers 22 which are applied with malicious intent on signs, are intended precisely to stand out as little as possible visually, so that no one discovers and removes them.

Thus, exactly the features of stop sign 21 which especially stand out in edge detection 2c, virtually do not come into play at all in location-resolved relevance evaluation 2a. In the same way, sticker 22, which is so important for relevance evaluation 2a, virtually does not come into play at all in edge detection 2c. Correlation 7 between relevance evaluation 2a and edge detection 2c is thus poor, which is able to be detected using method 200.

What is claimed is:

1. A method for plausibilizing output of an artificial neural network (ANN) used as classifier, the method comprising the following steps:
providing a plurality of images for which the ANN has determined an assignment to one or more classes of a predetermined classification, and the assignment determined for each of the images by the ANN;
determining, for each combination of one image of the images and one assignment of the assignments, a location-resolved relevance evaluation of the image using a relevance evaluation function, the relevance evaluation indicating which parts of the image have contributed, to what extent, to the assignment;
training a further classifier to determine from each image of the images and the relevance evaluation ascertained for the image, a reconstruction of the assignment to which the relevance evaluation relates; and
determining, based on an agreement between the reconstructions and the actual assignments, a figure of merit for the relevance evaluation function.

2. The method as recited in claim 1, wherein:
a quantity of available combinations of the images, the assignments, and the relevance evaluations, is split into a first subset of training data for the further classifier and a second subset of test data for the further classifier,
the further classifier is trained based on the training data, and
the agreement between the reconstructions and the actual assignments is determined based on the test data.

3. The method as recited in claim 1, wherein the figure of merit is determined for a selection of several candidate relevance evaluation functions, and one candidate relevance evaluation function having a best value of the figure of merit is selected as the relevance evaluation function.

4. The method as recited in claim 1, wherein the figure of merit is determined additionally for:
an identical mapping of the image,
an area filled with random values,
an area filled with one constant value,
a semantic segmentation of the image, or
an edge detection from the image as location-resolved comparison relevance evaluation.

5. The method as recited in claim 4, wherein a relevance evaluation function or candidate relevance evaluation function, whose figure of merit is poorer than the figure of merit determined for the comparison relevance evaluation, is rejected as implausible.

6. The method as recited in claim 1, wherein a plausibility of the output of the ANN is evaluated based on the relevance evaluation function, based on the figure of merit of the relevance evaluation function, or based on a relevance evaluation determined using the relevance evaluation function.

7. The method as recited in claim 6, wherein the plausibility is output to a user of the ANN via a display.

8. The method as recited in claim 1, wherein the ANN is a convolutional ANN, and the relevance evaluation function includes a weighted summation of activation cards of a plurality of convolution kernels that are applied to the image or to a processing product of the image in one layer of the ANN.

9. A method for plausibilizing the output of an artificial neural network (ANN) used as classifier, comprising the following steps:
providing at least one image for which the ANN has determined an assignment to one or more classes of a predetermined classification, and the assignment determined by the ANN for the image;
determining, for a combination of the image and the assignment determined for the image, a location-resolved relevance evaluation of the image, using a relevance evaluation function, the relevance evaluation indicating which parts of the image have contributed, to what extent, to the assignment;
determining a correlation between the relevance evaluation and a semantic segmentation of the image or an edge detection from the image; and
determining that the correlation is a measure for plausibility of the output of the ANN.

10. The method as recited in claim 9, wherein the relevance evaluation function is selected or formed by:
providing a plurality of images for which the ANN has determined an assignment to one or more classes of a predetermined classification, and the assignment determined for each of the images by the ANN;

determining, for each combination of one image of the images and one assignment of the assignments, a location-resolved relevance evaluation of the image using a candidate relevance evaluation function, the relevance evaluation indicating which parts of the image have contributed, to what extent, to the assignment;

training a further classifier to determine from each image of the images and the relevance evaluation ascertained for the image, a reconstruction of the assignment to which the relevance evaluation relates; and determining, based on an agreement between the reconstructions and the actual assignments, a figure of merit for the candidate relevance evaluation function;

wherein the figure of merit is determined for a selection of several candidate relevance evaluation functions, and one candidate relevance evaluation function having a best value of the figure of merit is selected as the relevance evaluation function.

11. The method as recited in claim 9, wherein, in response to a drop of the correlation below a predetermined threshold value, a technical system which acts in at least partially automated fashion based on the assignment determined by the ANN is controlled to reduce disadvantageous consequences of an incorrect assignment.

12. The method as recited in claim 9, wherein the image is selected which has come about through an observation of the area surrounding a robot or vehicle, and in response to a drop of the correlation below a predetermined threshold value, the robot, or the vehicle is controlled to the effect that:

at least one additional physical sensor is activated for observing the area surrounding the robot or vehicle;

a driving speed of the robot or the vehicle driving in at least partially automated fashion is reduced;

a driver assistance system or a system for the at least partially automated guidance of the robot or the vehicle is completely or partially deactivated; or the robot or the vehicle driving in at least partially automated fashion, is brought to a stop on a preplanned emergency-stop trajectory.

13. A non-transitory machine-readable data carrier on which is stored a computer program for plausibilizing output of an artificial neural network (ANN) used as classifier, the computer program, when executed by a computer, causing the computer to perform the following steps:

providing a plurality of images for which the ANN has determined an assignment to one or more classes of a predetermined classification, and the assignment determined for each of the images by the ANN;

determining, for each combination of one image of the images and one assignment of the assignments, a location-resolved relevance evaluation of the image using a relevance evaluation function, the relevance evaluation indicating which parts of the image have contributed, to what extent, to the assignment;

training a further classifier to determine from each image of the images and the relevance evaluation ascertained for the image, a reconstruction of the assignment to which the relevance evaluation relates; and determining, based on an agreement between the reconstructions and the actual assignments, a figure of merit for the relevance evaluation function.

14. A computer configured to plausibilize output of an artificial neural network (ANN) used as classifier, the computer configured to:

provide a plurality of images for which the ANN has determined an assignment to one or more classes of a predetermined classification, and the assignment determined for each of the images by the ANN;

determine, for each combination of one image of the images and one assignment of the assignments, a location-resolved relevance evaluation of the image using a relevance evaluation function, the relevance evaluation indicating which parts of the image have contributed, to what extent, to the assignment;

train a further classifier to determine from each image of the images and the relevance evaluation ascertained for the image, a reconstruction of the assignment to which the relevance evaluation relates; and determine, based on an agreement between the reconstructions and the actual assignments, a figure of merit for the relevance evaluation function.

\* \* \* \* \*